(12) United States Patent
Sylvan et al.

(10) Patent No.: US 7,063,190 B1
(45) Date of Patent: Jun. 20, 2006

(54) BRAKING SYSTEM

(75) Inventors: Dale A. Sylvan, Buffalo Grove, IL (US); Craig H. Scott, Highland Park, IL (US); Anton A. Petrou, Lombard, IL (US)

(73) Assignee: MPC Products Corporation, Skokie, IL (US)

( * ) Notice: Subject to any disclaimer, the term of this patent is extended or adjusted under 35 U.S.C. 154(b) by 0 days.

(21) Appl. No.: 10/658,964

(22) Filed: Sep. 9, 2003

(51) Int. Cl.
*B60L 7/00* (2006.01)

(52) U.S. Cl. ........................................ 188/161; 188/171

(58) Field of Classification Search ................ 188/158, 188/159, 161, 163, 164, 166, 171, 179; 192/90, 192/84.92
See application file for complete search history.

(56) References Cited

U.S. PATENT DOCUMENTS

| | | | | |
|---|---|---|---|---|
| 1,756,907 A * | 4/1930 | Payne | ..................... | 192/84.91 |
| 2,405,698 A | 8/1946 | Jameson | | |
| 2,983,339 A * | 5/1961 | Neff | ............... | 188/171 |
| 3,204,731 A | 9/1965 | Bent et al. | | |
| 3,327,822 A * | 6/1967 | Spencer | .................. | 192/84.92 |
| 3,578,119 A | 5/1971 | Auriol | | |
| 3,603,437 A * | 9/1971 | Spencer | ..................... | 192/53.2 |
| 3,623,577 A | 11/1971 | Scharlack | | |
| 3,726,373 A * | 4/1973 | Miller | ...................... | 192/84.3 |
| 3,917,042 A * | 11/1975 | Summa | ................... | 192/84.92 |
| 4,213,521 A | 7/1980 | Modersohn | | |
| 4,287,978 A | 9/1981 | Staub, Jr. | | |
| 4,387,794 A | 6/1983 | Schneider et al. | | |
| 5,033,278 A * | 7/1991 | Hossfield et al. | ............ | 68/23.7 |
| D352,021 S | 11/1994 | Powers | | |
| 5,765,671 A * | 6/1998 | Endo et al. | ................ | 192/48.2 |
| 5,819,888 A | 10/1998 | Tamura et al. | | |
| 6,015,032 A | 1/2000 | McGourthy, Jr. et al. | | |
| 6,112,873 A * | 9/2000 | Prasse et al. | ............ | 192/69.83 |
| 6,155,386 A * | 12/2000 | Hirai et al. | ................. | 188/161 |
| 6,196,361 B1* | 3/2001 | Russ et al. | .................. | 188/161 |
| 6,321,883 B1* | 11/2001 | Pfann et al. | ................ | 188/161 |
| 6,744,162 B1* | 6/2004 | Pierre et al. | .................. | 310/77 |
| 2002/0046912 A1 | 4/2002 | Suzuki | | |

FOREIGN PATENT DOCUMENTS

GB 2114689 A 8/1983
WO WO 2003/062115 A 7/2003

* cited by examiner

*Primary Examiner*—Devon Kramer
(74) *Attorney, Agent, or Firm*—Gardner Carton & Douglas, LLP

(57) ABSTRACT

A braking system having a brake disc and a brake plate. The brake disc and brake plate each include three plateaus that include ramps on each end. The plateaus of the brake disc are configured to substantially mate with the plateaus of the brake plate.

20 Claims, 2 Drawing Sheets

BRAKING SYSTEM

BACKGROUND OF THE INVENTION

The present invention relates to braking systems and particularly to dynamic braking systems. More particularly, the present invention relates to braking systems utilizing the engagement of a brake plate against a brake disc to brake a rotating shaft.

Conventional braking systems typically include a brake disc that rotates with a rotating shaft and a brake plate that engages the brake disc to brake the disc and thereby slow and stop movement of the shaft. The rotating shaft may be a vehicle axle, a component of a powered door hinge, or any other rotating shaft that requires braking. The brake plate brakes the brake disc by relying either on friction between a face of the brake plate and a face of the brake disc or through positive mechanical engagement of teeth on the brake plate and corresponding teeth on the brake disc.

SUMMARY OF THE INVENTION

Conventional braking systems that rely on friction can be unreliable in high-vibration environments where the spring or other mechanism that supplies the normal force between the brake disc and the brake plate relieves itself under the vibratory conditions and decreases the frictional force. Conventional braking systems that utilize the positive mechanical engagement of teeth on the brake disc and brake plate can suffer significant damage in high-velocity and high-vibration environments. The teeth of the brake disc or brake plate or both can break off in such environments. A braking system that provides and maintains sufficient braking force in a relatively high velocity, high-vibration environment will be welcome by users of such braking systems.

According to the present invention, a braking system is provided for braking a shaft mounted for rotation that includes a brake disc, a brake plate, and a spring. The brake disc is coupled to the shaft for rotation therewith and includes a disc face having a plurality of disc plateaus positioned around the circumference of the disc. Each disc plateau includes a disc ramp extending between the disc face and a top surface of the disc plateau. The brake plate is relatively stationary; thus, the brake disc rotates relative to it. The brake plate includes a brake face positioned substantially parallel and adjacent to the disc face and includes a plurality of plate plateaus corresponding to the number of disc plateaus. Each plate plateau includes a plate ramp extending between the plate face and a top surface of the plate plateau. The plate ramps are angled relative to the plate face at the same angle at which the disc ramps are angled to the disc face. Recesses defined between consecutive plate plateaus are dimensioned to correspond to the disc plateaus such that the disc plateaus mate with the recesses. A spring biases the disc face against the plate face.

Additional features and advantages of the invention will become apparent to those skilled in the art upon consideration of the following detailed description exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
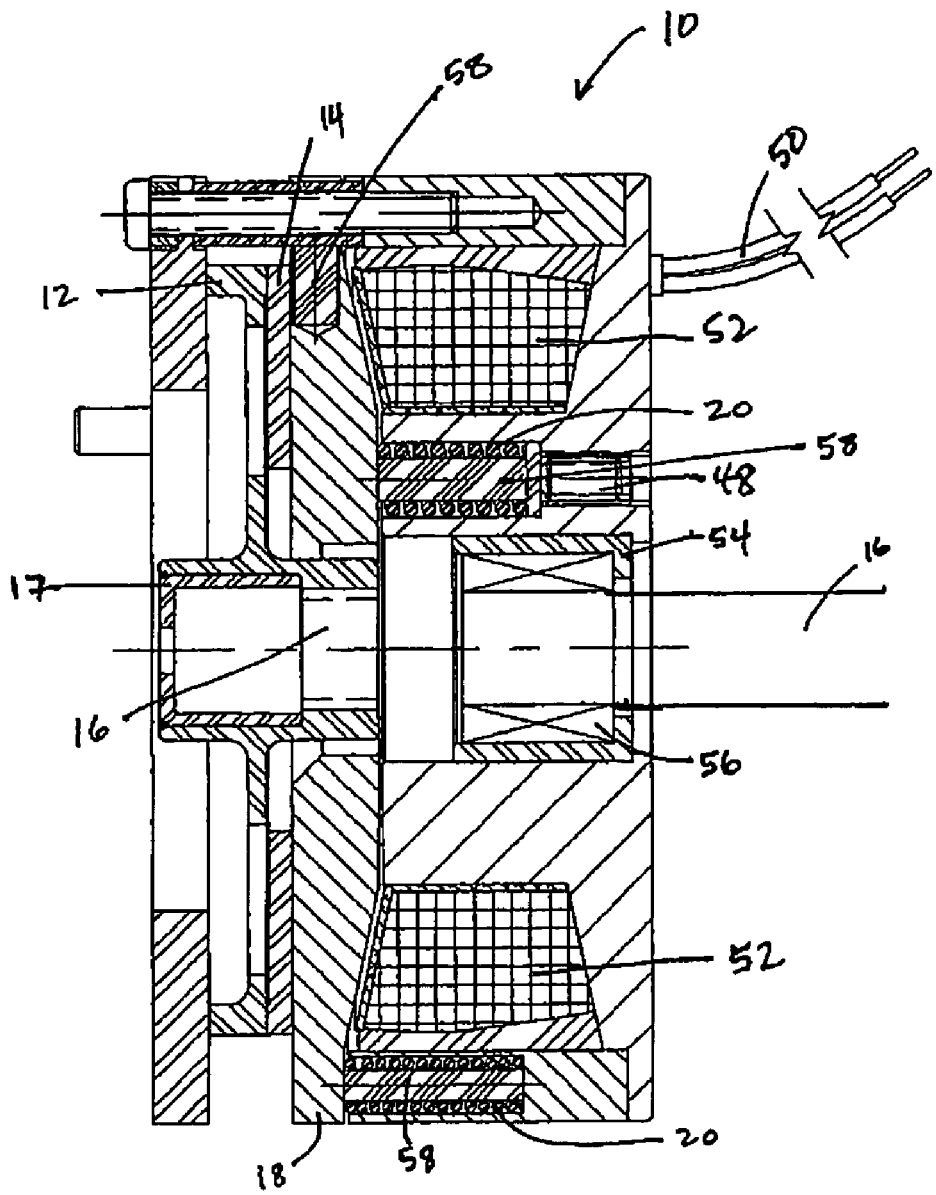
FIG. 1 is a cross-sectional view of the braking system in accordance with the present invention, including a brake disc and a brake plate.

Referring to FIG. 1, a braking system 10 according to the present invention includes a brake disc 12, which engages a brake plate 14. The brake disc 12 is coupled to an insert 17 that is coupled to a shaft 16. The shaft 16 is mounted in a sleeve 54 and bearing 56 combination for rotation with respect to a base member 18 that is relatively stationary within the system 10. By "relatively stationary" it is meant that the base member 18 does not rotate (as discussed below it does translate slightly) with respect to the majority of the parts of the system 10 or the overall device that utilizes the braking system 10. On the other hand, the shaft 16 does rotate with respect to the majority of the parts of the system 10 and the overall device.

Mounted for rotation, the shaft 16 could act as any of a number of things, including the hinge of an aircraft door or the axle of a vehicle, such as an airplane, etc., that creates a high-velocity, high-vibration environment. The brake plate 14 is mounted to the base member 18. Therefore, when the shaft 16 (along with the insert 17) rotates, the brake disc 12 rotates relative to the brake plate 14. A series of springs 20 bias the brake plate 14 against the brake disc 12 to provide a normal force between the two that engages the brake plate 14 with the brake disc 12 and brakes the shaft 16. The specifics of the engagement between the brake plate 14 and the brake disc 12 will be further discussed below. Some of the springs 20 include adjustment screws 48 that can be turned to adjust the force applied on the base member 18 by the springs 20.

With the braking system 10 positioned as shown in FIG. 1, the system 10 provides a braking force on the shaft 16. To release the braking force, power is supplied through cables 50 to a coil 52. When power is supplied to the coil 52, a magnetic field is created that attracts the base member 18 toward the coil 52 with sufficient force to overcome the force of the springs 20. The base member 18 is designed and constructed of metal to respond to the magnetic field created by the coil 52. As discussed above, the brake plate 14 is mounted to the base member 18 and, therefore, when the coil 52 is powered, the brake plate 14 also moves towards the coil 52. This moves the brake plate 14 out of engagement with the brake disc 12. If power to the coil 52 is lost or intentionally cut, the springs 20 again take over and force the brake plate 14 into engagement with the brake disc 12. Thus, the system 10 is considered "fail-safe" in that the system 10 brakes (i.e., engages the brake plate 14 to stop rotation of the shaft 16) if power is lost. However, it will be apparent to those of ordinary skill in the art that the system 10 could be designed to be "fail-secure" wherein the system 10 brakes when power is supplied to the coil 52.

Figure 2:
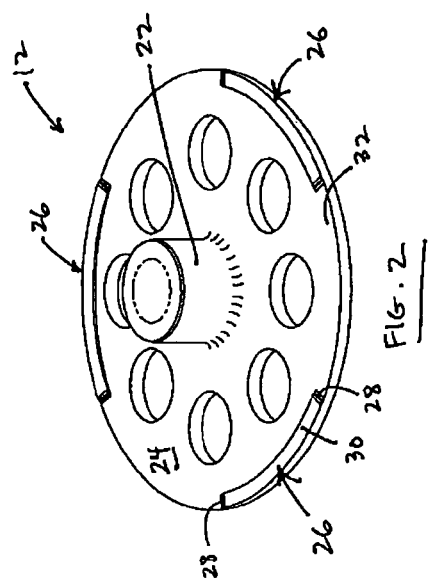
FIG. 2 is a perspective view of the brake disc of FIG. 1.

Referring to FIG. 2, the brake disc 12 includes a connection hub 22 that is coupled to the insert 17 and, in turn, the shaft 16. The brake disc 12 is generally circular and includes a disc face 24 having three disc plateaus or disc teeth 26 projecting therefrom. Each disc plateau 26 includes two disc ramps 28 transitioning between the disc face 24 and a top surface 30 of the disc plateau 26.

The disc plateaus 26 are arranged generally around the circumference of the brake disc 12 and are equally spaced approximately 120° from each other. The disc plateaus 26 are sized so that they cover approximately one-half of the total circumference of the brake disc 12. Between consecutive disc plateaus 26, disc recesses 32 are created and cover approximately the other half of the circumference of the brake disc 12. The disc ramps 28 are angled approximately 10° relative to the disc face 24 to create a relatively shallow transition between the disc recesses 32 and the top surfaces 30 of the disc plateaus 26.

Figure 3:
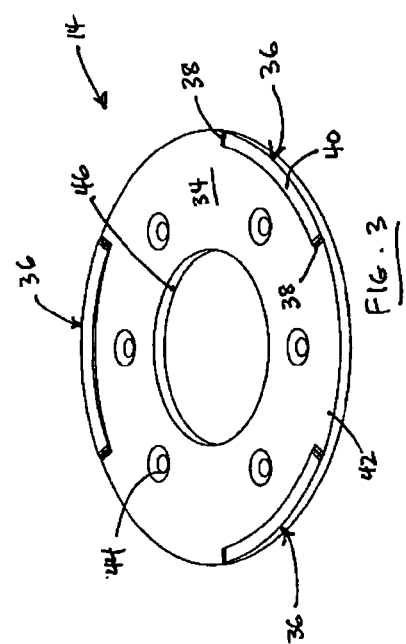
FIG. 3 is a perspective view of the brake plate of FIG. 1.

Referring to FIG. 3, the brake plate 14 has a plate face 34, including a series of plate plateaus or plate teeth 36 that generally correspond to the disc plateaus or disc teeth 26, discussed above. As with the disc plateaus 26, the plate plateaus 36, which include plate ramps 38 angled at approximately 10°, extend between the plate face 34 and a top surface 40 of the plate plateaus 36. In the illustrated embodiment, the disc ramps 28 and plate ramps 38 are angled at the same angle (i.e., approximately 10°). While angling the disc ramps 28 and the plate ramps 38 at the same angle is preferred as illustrated in the Figures, the ramps 28, 38 could be angled at slightly different angles (e.g., one at 9° and the other at 11°) or even more disparate angles (e.g., one at 5° and one at 20°). In all cases, however, the ramps 28 and 38 will be angled at shallow angles (i.e., between 5° and 20°).

Again, as with the disc plateaus 26, the plate plateaus 36 are spaced approximately 120° from each other around the circumference of the brake plate 14. A series of plate recesses 42 are defined along the circumference of the brake plate 14 between the plate plateaus 36 and cover approximately one-half of the plate circumference, with the plate plateaus 36 covering approximately the other half. A series of counter-sunk holes 44 through the brake plate 14 are used to mount the brake plate 14 to the base member 18 (see FIG. 1) so that the brake plate 14 is relatively stationary with respect to the base member 18. The insert 17 (and, thus, the shaft 16 attached to it) and brake disc 12 rotate relative to the brake plate 14 and the housing 18.

The connecting hub 22 of the brake disc 12 and the shaft 16 extend through a central aperture 46 of the brake plate 14, thereby positioning the disc face 24 adjacent the plate face 34. In this way, the top surfaces 30 of the disc plateaus 26 mate with the plate recesses 42 of the disc plate 14 and the top surfaces 40 of the plate plateaus 36 mate with the disc recesses 32 of the brake disc 12. Also, the disc ramps 28 are in engagement with the plate ramps 38. As the brake disc 12 rotates with the shaft 16, the disc plateaus 26 ride up the plate ramps 38 and onto the plate plateaus 36. The top surfaces 30 of the disc plateaus 36 then slide over the top surfaces 40 of the plate plateaus 36. The brake disc 12 must overcome the biasing force provided by the springs 20 to cause the disc plateaus 26 to ride up the plate ramps 38 and over the top surfaces 40 of the plate plateaus 36. The frictional force provided by the sliding engagement of the top surfaces 30 of the disc plateaus 26 over the top surfaces 40 of the plate plateaus 36, and the force provided by the positive mechanical engagement provided between the disc ramps 28 and the plate ramps 38 when the disc plateaus 26 are mated with the plate recesses 32, provide the braking force to brake the shaft 16 and, thus, for example, a vehicle to which the shaft 16 is coupled. Once the braking process is complete, the positive mechanical engagement of the disc ramps 28 and the plate ramps 38, "locks" the shaft 16 in position, preventing further rotation of it.

As an example, the braking system 10 of the present invention could be used to brake the hinge shaft of a large cargo door on a transport aircraft. The system 10 would be powered, thereby releasing the brake plate 14 from the brake disc 12 to allow the shaft 16 to rotate while the door is being closed. As the door approaches its closed position, power would be removed from the system 10 and the springs 20 would force the brake plate 14 into engagement with the brake disc 12, as shown in FIG. 1. The interaction of the plate plateaus 36 against the disc plateaus 26 causes the shaft 16 to dynamically brake. That is, the shaft 16 may continue to rotate for a number of turns after the brake plate 14 has engaged the brake disc 12, but the engagement of the plateaus 26, 36 will cause the shaft 16 to begin slowing down and eventually stop. Once the shaft 16 has stopped rotating, the positive engagement of the plate plateaus 36 with the disc plateaus 26 provides a secure brake/lock preventing the shaft 16 from rotation even in the high vibratory environment of an aircraft. To help counter vibratory forces acting on the system 10, a number of plugs 58 made of an elastic material such as rubber, Viton, etc. are placed through the system 10 to help dampen vibration in the system 10. Even if the force of the springs 20 varies somewhat under the forces created by the vibratory environment, the positive engagement of the plateaus 26, 36 will not allow the brake disc 12 to rotate relative to the brake plate 14, which in turn means the cargo door will not move from its closed position. Thus, the at-rest state of the system 10, with power removed, provides a secure, closed state for the cargo door.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A braking system for a shaft mounted for rotation, the braking system comprising:
   a brake disc coupled to the shaft for rotation therewith, the disc including a disc face having a plurality of disc plateaus positioned around the circumference of the disc, each disc plateau including a pair of disc ramps disposed at opposite ends of the disc plateau, each of the disc ramps extending between the disc face and a top surface of the disc plateau at an angle of approximately 10° relative to the disc face;
   a brake plate mounted to be relatively stationary, the brake disc being rotatable with respect to the brake plate, the brake plate including a plate face positioned substantially parallel and adjacent to the disc face and including a plurality of plate plateaus corresponding to the number of disc plateaus, each plate plateau including a pair of plate ramps disposed at opposite ends of the disc plateau, each of the plate ramps extending between the plate face and a top surface of the plate plateau, the plate ramps being angled relative to the plate face at approximately the same angle at which the disc ramps are angled relative to the disc face, the plate plateaus defining recesses between consecutive plate plateaus that are dimensioned to correspond to the disc plateaus such that the disc plateaus mate with the recesses; and
   a spring, the disc face and the plate face being biased against each other by the spring to cause a braking force from sliding contact between the disc plateaus and the plate plateaus and to cause a locking force when said plateaus mate with the recesses.

2. The braking system of claim 1, wherein the disc ramp is extends between the disc face and a top surface of the disc plateau at an angle of between approximately 5° and 20°.

3. The braking system of claim 1, wherein the plurality of disc plateaus comprises three disc plateaus angularly disposed about 120° from each other, the disc plateaus being sized to collectively cover about one-half of the circumference of the disc; and wherein the plurality of plate plateaus comprises three plate plateaus angularly disposed about 120° from each other, the plate plateaus being sized to collectively cover about one-half of the circumference of the plate.

4. The braking system of claim 3, wherein the disc ramp is angled approximately 10° relative to the disc face.

5. The braking system of claim 4, wherein the plate ramp is angled approximately 10° relative to the plate face.

6. The braking system of claim 1, wherein the disc ramp is angled at an angle of between approximately 5° and 20°.

7. A braking system for braking a rotatable shaft, the system comprising:
a brake plate moveable between an engaged position and a retracted position, the brake plate including a plate face having a plurality of plate plateaus positioned around the circumference of the brake plate, each plate plateau including a pair of plate ramps disposed at opposite ends of the plate plateau, each of the plate ramps extending between the plate face and a top surface of the plate plateau, the plate ramps being angled at an angle of between approximately 5° and 20° relative to the top surface;
a coil that is powered to create a magnetic field to move the brake plate between its engaged and retracted positions;
a brake disc mounted to the shaft for rotation relative to the brake plate, the brake disc including a disc face positioned substantially parallel and adjacent to the plate face and including a plurality of disc plateaus, each disc plateau including a pair of disc ramps disposed at opposite ends of the disc plateau, each of the disc ramps extending between the disc face and a top surface of the disc plateau, the disc ramps being angled at an angle of between approximately 5° and 20° relative to the disc face, the disc plateaus defining recesses between consecutive disc plateaus that are dimensioned to correspond to the plate plateaus such that the plate plateaus mate with the recesses; and
a spring, the disc face and the plate face being biased against each other by the spring.

8. The braking system of claim 7, wherein the number of plate plateaus is equal to the number of disc plateaus.

9. The braking system of claim 8, wherein the plate ramps are angled at the same angle as the disc ramps.

10. The braking system of claim 9, wherein there are three plate plateaus and three disc plateaus.

11. The braking system of claim 10, wherein the plate ramps and the disc ramps are angled at approximately 10°.

12. The braking system of claim 7, wherein there are three plate plateaus and three disc plateaus.

13. The braking system of claim 7, wherein the plate ramps and the disc ramps are angled at approximately 10°.

14. A method of braking a rotating shaft, the method comprising:
attaching the shaft to a brake disc, the brake disc having a disc face with shallow disc plateaus protruding from it, each disc plateau including a pair of disc ramps disposed at opposite ends of the disc plateau, each of the disc ramps extending between the disc face and a top surface of the disc plateau at an angle of approximately 5° to 20° relative to the disc face; and
providing a brake plate with a plate face and a spring force to selectively engage the plate face of the brake plate with the disc face of the brake disc, the plate face having shallow plate plateaus protruding from it, each plate plateau including a pair of plate ramps disposed at opposite ends of the plate plateau, each of the plate ramps extending between the plate face and a top surface of the plate plateau, the plate ramps being angled relative to the plate face at approximately the same angle at which the disc ramps are angled relative to the disc face, the spring force being chosen to permit the disc plateaus to slide over the plate plateaus in a dynamic braking portion of the method and prevent sliding of the disc plateaus over the plate plateaus in a locking portion of the method.

15. The method of claim 14, wherein there are three disc plateaus and three plate plateaus.

16. The braking system of claim 1, wherein the plate face is biased toward the disc face by the spring.

17. The braking system of claim 7, wherein the plate face is biased toward the disc face by the spring.

18. The braking system of claim 7, wherein the spring engages the brake plate and biases the plate face toward and against the disc face.

19. The method of claim 14, further comprising applying the spring force to the brake plate and biasing the plate face toward and against the disc face with the spring force.

20. The method of claim 14, wherein each disc plateau includes a pair of disc ramps disposed at opposite ends of the disc plateau, each of the disc ramps extending between the disc face and a top surface of the disc plateau, and wherein the plurality of plate plateaus correspond to the number of disc plateaus and each plate plateau includes a pair of plate ramps disposed at opposite ends of the plate plateau, each of the plate ramps extending between the plate face and a top surface of the plate plateau, the disc ramps being angled approximately 10° relative to the disc face and the plate ramps being angled approximately 10° relative to the plate face.

* * * * *